United States Patent
Otani et al.

(10) Patent No.: US 12,370,835 B2
(45) Date of Patent: Jul. 29, 2025

(54) MOTORCYCLE TIRE SET

(71) Applicant: SUMITOMO RUBBER INDUSTRIES, LTD., Hyogo (JP)

(72) Inventors: Masafumi Otani, Hyogo (JP); Ryosuke Morimura, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 20 days.

(21) Appl. No.: 18/398,559

(22) Filed: Dec. 28, 2023

(65) Prior Publication Data
US 2024/0246366 A1    Jul. 25, 2024

(30) Foreign Application Priority Data
Jan. 25, 2023  (JP) .................. 2023-009621

(51) Int. Cl.
*B60C 11/03* (2006.01)
*B60C 19/00* (2006.01)

(52) U.S. Cl.
CPC ........ *B60C 11/0302* (2013.01); *B60C 11/032* (2013.01); *B60C 19/001* (2013.01); *B60C 2011/0381* (2013.01); *B60C 2200/10* (2013.01)

(58) Field of Classification Search
CPC .............. B60C 19/001; B60C 2200/10; B60C 11/0332; B60C 11/0302
See application file for complete search history.

(56) References Cited

U.S. PATENT DOCUMENTS

D748,040 S      1/2016  Lucas
D853,316 S *    7/2019  Sato .................... D12/535
11,554,612 B2   1/2023  Hikita
11,560,018 B2   1/2023  Hikita
2011/0253276 A1* 10/2011 Misani ................ B60C 11/0302
                                                    152/209.1
2020/0282774 A1  9/2020  Hikita
(Continued)

FOREIGN PATENT DOCUMENTS

CN    115027183 A  *  9/2022  ......... B60C 11/0304
EP    4 035 910           8/2022
(Continued)

OTHER PUBLICATIONS

Extended European Search Report for EP application No. 24151870.3 dated Jun. 5, 2024.

*Primary Examiner* — Blaine Copenheaver
*Assistant Examiner* — Thomas Frank Schneider
(74) *Attorney, Agent, or Firm* — Greenblum & Bernstein, P.L.C.

(57) ABSTRACT

A motorcycle tire set S includes a front wheel tire S1 and a rear wheel tire S2 each provided with a plurality of inclined grooves 3. Each inclined groove 3 includes a first portion 11 extending in a crown region Cr, a second portion 12 extending in a shoulder region Sh, and a third portion 13 connecting the first portion 11 and the second portion 12. The third portion 13 has a smaller groove width than the first portion 11 and the second portion 12. The first portion 11, the second portion 12, and the third portion 13 are inclined in the same direction with respect to a tire circumferential direction. Each inclined groove 3 of the rear wheel tire S2 comes into contact with the ground from the first portion 11 toward the third portion 13 based on a tire rotation direction R.

15 Claims, 8 Drawing Sheets

(56) References Cited

U.S. PATENT DOCUMENTS

| | | | |
|---|---|---|---|
| 2020/0282775 A1* | 9/2020 | Hikita | ................ B60C 11/0302 |
| 2022/0234392 A1 | 7/2022 | Ichiryu | |
| 2023/0339269 A1* | 10/2023 | Harada | ............... B60C 11/0302 |

FOREIGN PATENT DOCUMENTS

| | | | |
|---|---|---|---|
| JP | 2009012543 A | * | 1/2009 |
| JP | 2020-142587 | | 9/2020 |
| JP | 2022/161694 | | 10/2022 |
| JP | 2022-161695 | | 10/2022 |
| JP | 2022161694 A | * | 10/2022 |

\* cited by examiner

MOTORCYCLE TIRE SET

BACKGROUND OF THE INVENTION

Field of the Invention

The present invention relates to a motorcycle tire set.

Background Art

Japanese Laid-Open Patent Publication No. 2020-142587 describes a tire for a motorcycle in which a plurality of inclined grooves are provided on a tread portion so as to be inclined with respect to the tire circumferential direction. Each of the inclined grooves includes a first portion on a crown region side, a second portion on a shoulder region side, and a third portion connecting the first portion and the second portion. The third portion has a smaller groove width than the first portion and the second portion. Such a tire is considered to be able to have enhanced uneven wear resistance while maintaining drainage performance.

In recent years, it has been desired to further enhance uneven wear resistance while maintaining drainage performance.

The present invention has been made in view of the above circumstances, and a main object of the present invention is to provide a motorcycle tire set that can have further enhanced uneven wear resistance while maintaining drainage performance.

SUMMARY OF THE INVENTION

The present invention is directed to a motorcycle tire set including a front wheel tire and a rear wheel tire, wherein: each of the front wheel tire and the rear wheel tire has a plurality of inclined grooves provided on a tread portion thereof so as to be inclined in a tire circumferential direction; each of the plurality of inclined grooves includes a first portion extending in a crown region, a second portion extending in a shoulder region, and a third portion connecting the first portion and the second portion; the third portion has a smaller groove width than the first portion and the second portion; the first portion, the second portion, and the third portion are inclined in the same direction with respect to the tire circumferential direction; the tread portion of the rear wheel tire has a designated tire rotation direction; and each of the plurality of inclined grooves of the rear wheel tire comes into contact with ground from the first portion toward the third portion based on the tire rotation direction.

As a result of adopting the above configuration, the motorcycle tire set according to the present invention can have further enhanced uneven wear resistance while maintaining drainage performance.

DETAILED DESCRIPTION

Hereinafter, one embodiment of the present invention will be described with reference to the drawings. The drawings contain exaggerated expressions and expressions that differ from the dimensional ratio of the actual structure in order to help the understanding of the present invention. In addition, when there are a plurality of embodiments, the same or common elements are denoted by the same reference characters throughout the description, and the redundant description thereof is omitted.

Figure 1:
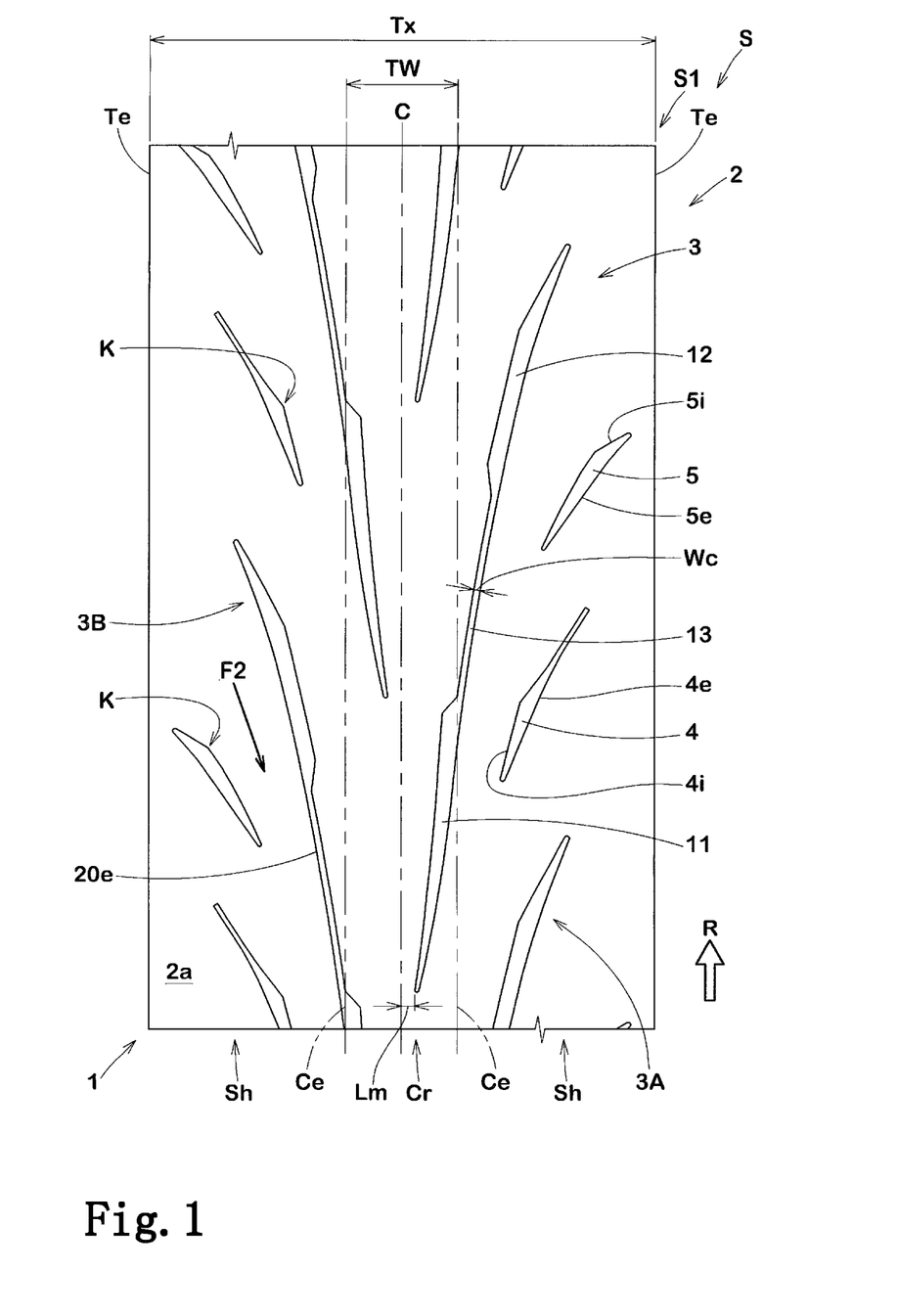
FIG. 1 is a plan view of a tread portion of a front wheel tire according to one embodiment of the present invention.
Figure 2:
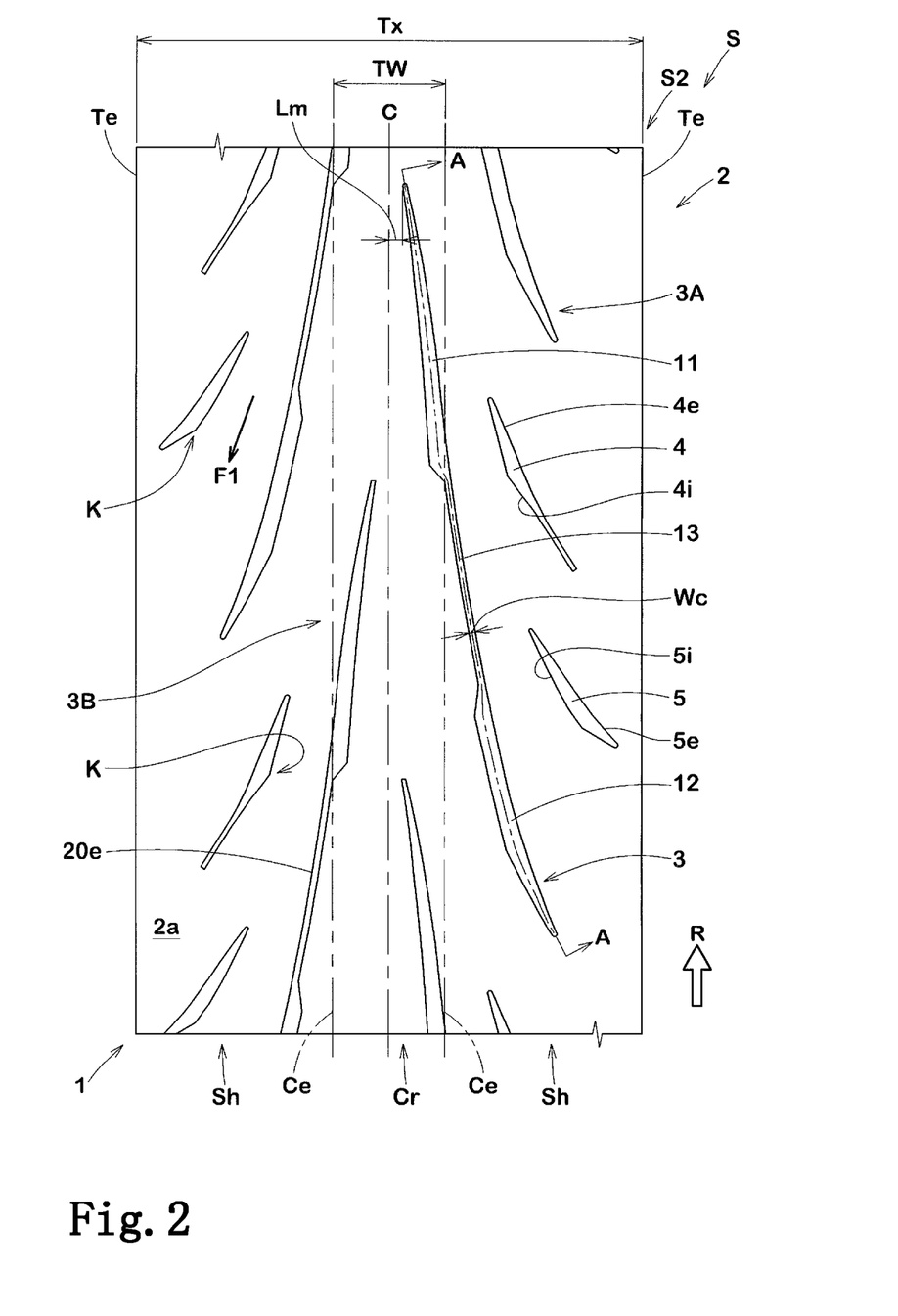
FIG. 2 is a plan view of a tread portion of a rear wheel tire according to the one embodiment of the present invention.

FIG. 1 is a plan view in which a tread portion 2 of a front wheel tire S1 of a motorcycle tire set (hereinafter, simply referred to as "tire set") S according to the present embodiment is developed in a flat surface. FIG. 2 is a plan view in which a tread portion 2 of a rear wheel tire S2 of the tire set S according to the present embodiment is developed in a flat surface. The tire set S is composed of the front wheel tire S1 and the rear wheel tire S2. In the present specification, each of the tires S1 and S2 is sometimes referred to as tire 1.

In the present specification, unless otherwise specified, dimensions and the like of components of the tire 1 are values measured in a standardized state. The "standardized state" is a state where the tire 1 is fitted on a standardized rim (not shown) and inflated to a standardized internal pressure and no load is applied to the tire 1.

The "standardized rim" is a rim that is defined, in a standard system including a standard on which the tire 1 is based, by the standard for each tire, and is, for example, the "standard rim" in the JATMA standard, the "Design Rim" in the TRA standard, or the "Measuring Rim" in the ETRTO standard.

The "standardized internal pressure" is an air pressure that is defined, in a standard system including a standard on which the tire 1 is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

The tread portion 2 of the front wheel tire S1 does not have a designated tire rotation direction R. On the other hand, as shown in FIG. 2, the tread portion 2 of the rear wheel tire S2 has a designated tire rotation direction R. Preferably, the tread portion 2 of the front wheel tire S1 shown in FIG. 1 comes into contact with the ground from the upper side toward the lower side in FIG. 1 based on the tire rotation direction R.

As shown in FIG. 1 and FIG. 2, each of the front wheel tire S1 and the rear wheel tire S2 has a plurality of inclined grooves 3 provided on the tread portion 2 so as to be inclined with respect to the tire circumferential direction. Each of the plurality of inclined grooves 3 includes a first portion 11 extending in a crown region Cr, a second portion 12 extending in a shoulder region Sh, and a third portion 13 connecting the first portion 11 and the second portion 12.

The third portion 13 has a smaller groove width Wc than the first portion 11 and the second portion 12. Such a third portion 13 suppresses a decrease in the stiffness of a center portion in the longitudinal direction of the inclined groove 3 in which relatively large deformation is likely to occur. The third portion 13 also suppresses slipping of the first portion 11 and the second portion 12 mainly in the tire circumferential direction during contact with the ground. Accordingly, uneven wear resistance is enhanced.

The first portion 11, the second portion 12, and the third portion 13 are inclined in the same direction with respect to the tire circumferential direction. Such an inclined groove 3 reduces drainage resistance and improves drainage performance.

In a motorcycle, the rear wheel tire S2 is mainly affected by a driving force. The direction of a resultant force F1 of the driving force and a lateral force during cornering is inclined from a tire equator C to a tread end Te side, toward the trailing edge side in the tire rotation direction R. Therefore, as shown in FIG. 2, in the rear wheel tire S2, each inclined groove 3 is formed so as to come into contact with the ground from the first portion 11 toward the third portion 13 based on the tire rotation direction R. Accordingly, the directions of the resultant force F1 and the inclined groove 3 are the same, and the tread stiffness in the vicinity of the inclined groove 3 is maintained at a high level. Therefore, uneven wear resistance can be further enhanced. In addition, each inclined groove 3 of such a rear wheel tire S2 can smoothly drain water in line with the tire rotation direction R, so that drainage performance can also be maintained at a high level.

In a motorcycle, the front wheel tire S1 is mainly affected by a braking force. As shown in FIG. 1, the direction of a resultant force F2 of the braking force and a lateral force during cornering is inclined from the tread end Te to the tire equator C side, toward the trailing edge side in the tire rotation direction R. Therefore, in the present embodiment, in the front wheel tire S1, each inclined groove 3 is formed so as to come into contact with the ground from the second portion 12 toward the third portion 13 based on the tire rotation direction R. Accordingly, the directions of the resultant force F2 and the inclined groove 3 are the same, and the tread stiffness in the vicinity of the inclined groove 3 can be maintained at a high level, so that uneven wear resistance can be further enhanced.

Each tread end Te corresponds to an outer end in the tire axial direction of the tread portion 2, and is, for example, an end that can come into contact with the ground during cornering around a maximum camber angle. In the present specification, the distance in the tire axial direction between the tread ends Te when the tread portion 2 is developed in a flat surface is defined as a tread development width Tx. The tire equator C is the midpoint between the tread ends Te.

In the present specification, the crown region Cr is a region that comes into contact with a flat surface when the tire 1 in the standardized state is brought into contact with the flat surface with the standardized load at a camber angle of 0 degrees. The length in the tire axial direction between both ends Ce in the tire axial direction of the crown region Cr is defined as a tread ground-contact width TW. In addition, each shoulder region Sh is a region between the crown region Cr and a tread end Te. Each shoulder region Sh is a region that comes into contact with the ground when a camber angle is given to the tire 1.

The "standardized load" is a load that is defined, in a standard system including a standard on which the tire 1 is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard.

In the tire 1, the inclined grooves 3 include, for example, first inclined grooves 3A arranged between the tire equator C and one tread end (right side in the drawing) Te, and second inclined grooves 3B arranged between the tire equator C and the other tread end Te. In the present embodiment, the first inclined grooves 3A and the second inclined grooves 3B are alternately arranged in the tire circumferential direction. The first inclined grooves 3A and the second inclined grooves 3B have a line symmetrical shape with respect to the tire equator C, for example.

Each inclined groove 3 extends without crossing the tire equator C. Such an inclined groove 3 suppresses a decrease in the tread stiffness on the tire equator C to which a large ground-contact pressure is applied, and maintains uneven wear resistance. In order to enhance uneven wear resistance and maintain drainage performance at a high level, a shortest distance Lm between the inclined groove 3 and the tire equator C is preferably not greater than 10% and further preferably not greater than 8% of the tread ground-contact width TW.

Figure 3:
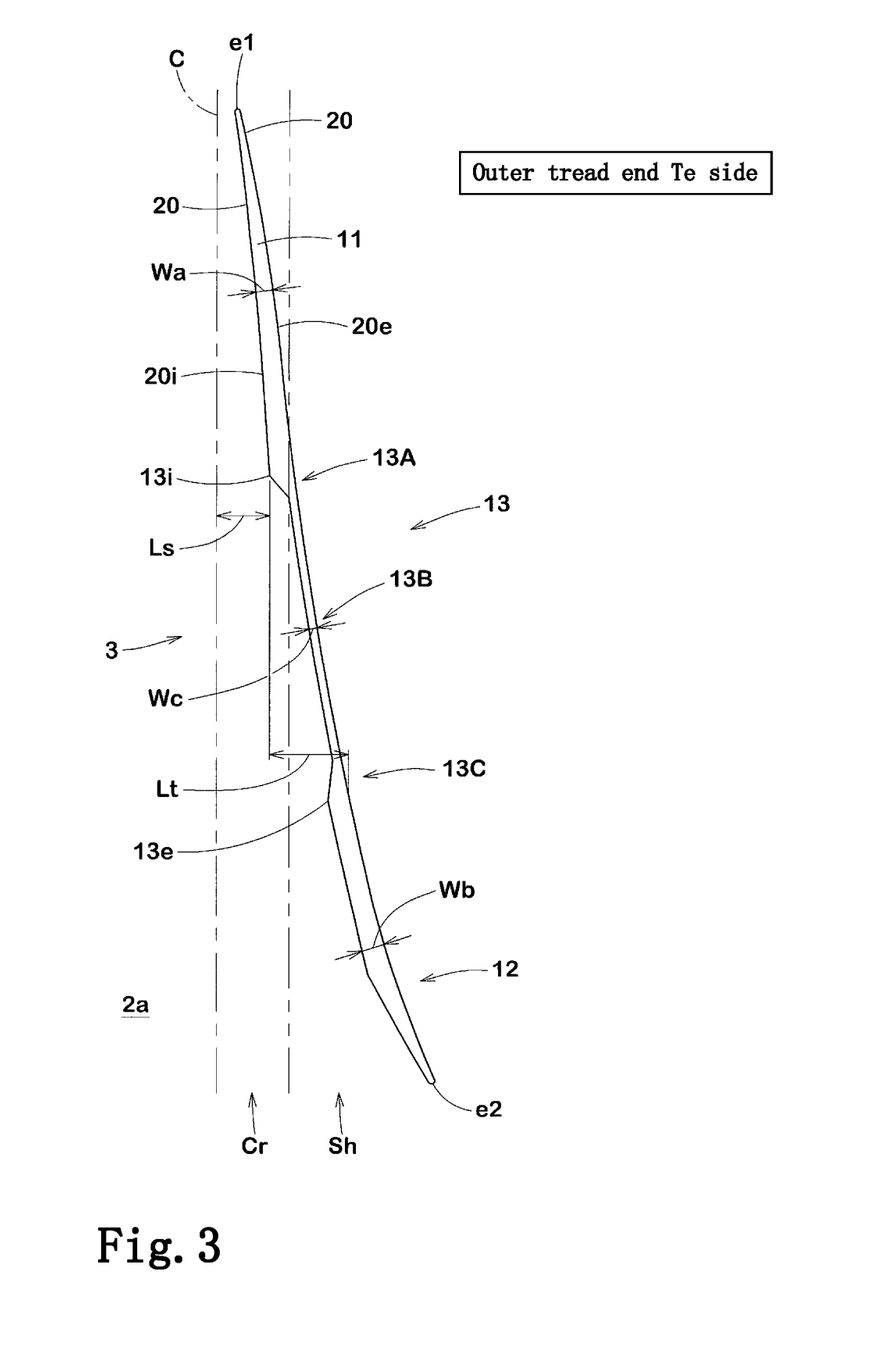
FIG. 3 is a plan view of an inclined groove of the rear wheel tire.

FIG. 3 is an enlarged view of an inclined groove 3 of the rear wheel tire S2. As represented in FIG. 3, in the front wheel tire S1 and the rear wheel tire S2, each inclined groove 3 has a pair of groove edges 20 extending in the longitudinal direction. The pair of groove edges 20 are composed of an inner groove edge 20$i$ on the tire equator C side and an outer groove edge 20$e$ located on the tread end Te side with respect to the inner groove edge 20$i$. The inner groove edge 20$i$ and the outer groove edge 20$e$ are connected at both ends e1 and e2 in the tire circumferential direction of the inclined groove 3.

The third portion 13 includes an inner end 13$i$ connected to the first portion 11 and an outer end 13$e$ connected to the second portion 12. The third portion 13 includes a first tapered portion 13A having a groove width that decreases from the inner end 13$i$ toward the second portion 12, and an equal width portion 13B extending with a constant groove width. In the present embodiment, the third portion 13 also includes a second tapered portion 13C having a groove width that decreases from the outer end 13$e$ toward the first portion 11. The equal width portion 13B includes not only a mode in which the groove width is uniform along the longitudinal direction but also a mode in which the difference between the maximum groove width and the minimum groove width is not greater than 2 mm. The difference between the maximum groove width and the minimum groove width of the equal width portion 13B is preferably not greater than 1 mm. In addition, the inner end 13$i$ and the outer end 13$e$ are ends located on the inner groove edge 20$i$ on the tire equator C side of the inclined groove 3.

A shortest distance Ls along a tread surface 2$a$ between the inner end 13$i$ and the tire equator C is preferably not less than 30% and further preferably not less than 35% of the tread ground-contact width TW (shown in FIG. 1), and is preferably not greater than 55% and further preferably not greater than 50% of the tread ground-contact width TW (shown in FIG. 1). Since the shortest distance Ls is not less than 30% of the tread ground-contact width TW, the first portion 11 can be positioned on the tire equator C side on which it is difficult to drain water, and drainage performance can be maintained at a high level. Since the shortest distance Ls is not greater than 55% of the tread ground-contact width TW, the inner end 13$i$ can be located away from the outer side of the ground-contact width where slipping is likely to occur due to the difference in tread outer diameter, so that occurrence of uneven wear can be suppressed.

A length Lt in the tire axial direction of the third portion 13 is preferably not less than 7% of the tread development width Tx (shown in FIG. 1). Such a third portion 13 maintains the tread stiffness of the shoulder region Sh at a high level and exhibits excellent uneven wear resistance. In consideration of suppressing a decrease in drainage performance, the length Lt of the third portion 13 is further preferably not less than 10% of the tread development width Tx, and is preferably not greater than 23% and further preferably not greater than 20% of the tread development width Tx.

As for the groove width, the third portion 13 is preferably not greater than 55% and further preferably not greater than 45% of the first portion 11 and the second portion 12. Since the groove width Wc of the third portion 13 is not greater than 55% of a groove width Wa of the first portion 11 and a groove width Wb of the second portion 12, the tread stiffness can be increased. If, as for the groove width, the third portion 13 is excessively smaller than the first portion 11 and the second portion 12, drainage performance may deteriorate. Therefore, the groove width Wc of the third portion 13 is preferably not less than 15% and further preferably not less than 20% of the groove width Wa of the first portion 11 and the groove width Wb of the second portion 12. The groove width Wc of the third portion 13 is preferably, for example, 1.2 to 3.5 mm. The groove width Wa of the first portion 11, the groove width Wb of the second portion 12, and the groove width Wc of the third portion 13 are each a groove width at the midpoint in the longitudinal direction.

On the tread surface 2a, a groove volume V3 per unit area (not shown) of the third portion 13 is preferably not less than 70% and further preferably not less than 75% of a groove volume V1 per unit area of the first portion 11 and a groove volume V2 per unit area of the second portion 12. Accordingly, smooth passage of water between the first portion 11 and the second portion 12 is maintained. In consideration of the viewpoint of maintaining the stiffness in the vicinity of the third portion 13 at a high level, the groove volume V3 of the third portion 13 is preferably not greater than 120% and further preferably not greater than 115% of the groove volume V1 of the first portion 11 and the groove volume V2 of the second portion 12. Each groove volume (V1, V2, and V3) per unit area is a value obtained by dividing the groove volume of each portion by the area (surface area) of each portion on the tread surface 2a.

Figure 4:
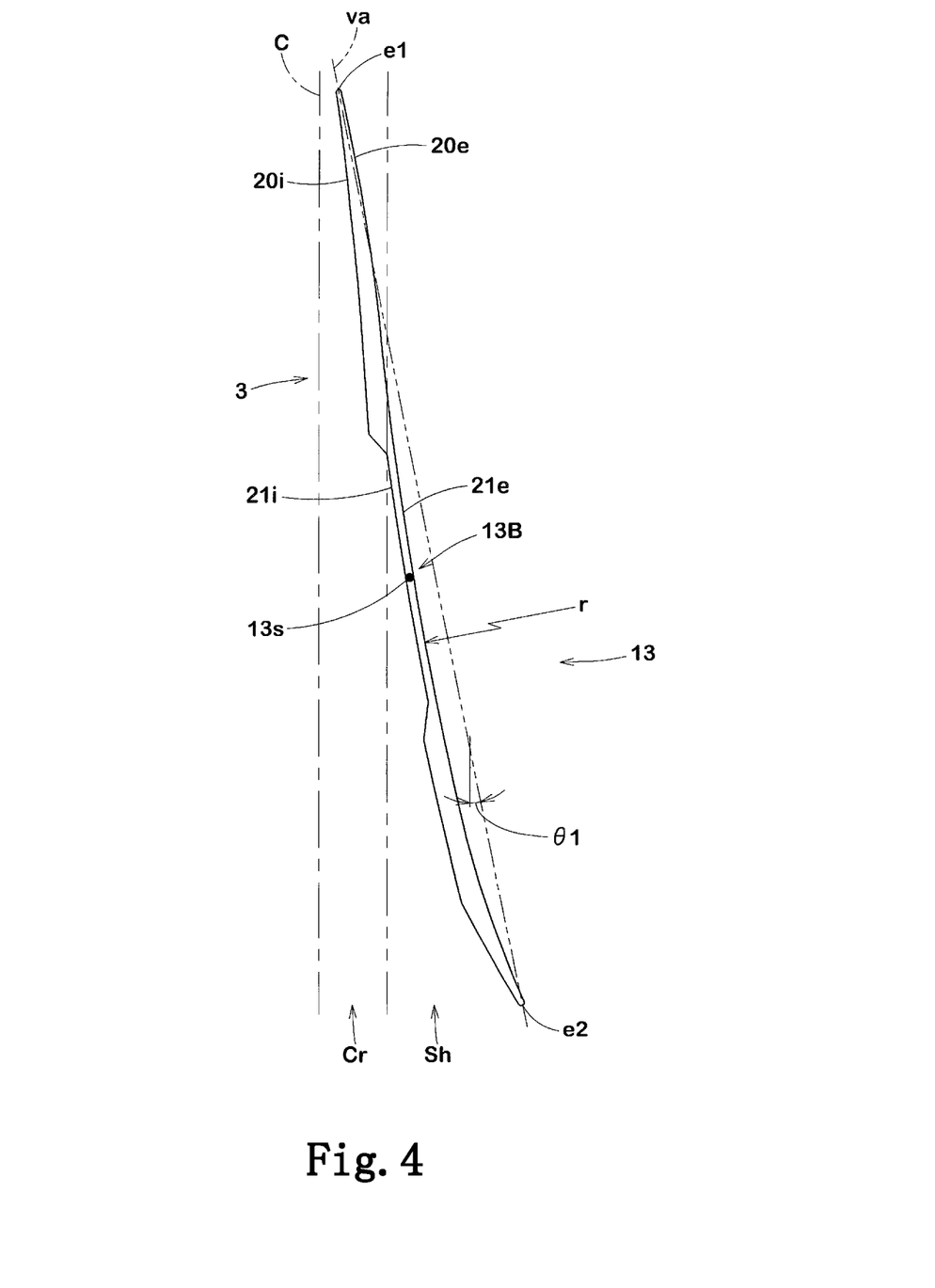
FIG. 4 is a plan view of the inclined groove of the rear wheel tire.

FIG. 4 is an enlarged view of the inclined groove 3 of the rear wheel tire S2. As represented in FIG. 4, in the front wheel tire S1 and the rear wheel tire S2, the inner groove edge 20i includes an inner third edge portion 21i forming the equal width portion 13B of the third portion 13. The outer groove edge 20e includes an outer third edge portion 21e forming the equal width portion 13B of the third portion 13.

In a tread plan view, the third portion 13 extends in a straight manner in the present embodiment. Such a third portion 13 has low drainage resistance and serves to maintain drainage performance at a high level. In the present specification, the "straight manner" includes not only a mode in which the inner third edge portion 21i and the outer third edge portion 21e of the third portion 13 are formed only by straight lines, but also a mode in which, for example, the edge portions 21i and 21e are each formed by an arc having a radius of curvature r exceeding 200 mm. The third portion 13 may, for example, extend in a curved manner in which the edge portions 21i and 21e are each formed by an arc having a radius of curvature r of 20 to 200 mm.

In the present embodiment, the third portion 13 extends in the crown region Cr and the shoulder region Sh. A midpoint 13s of the third portion 13 is located in the shoulder region Sh. The shoulder region Sh is a region that has a smaller tire circumferential length than the crown region Cr and in which slipping is likely to occur. Therefore, slipping in the shoulder region Sh is suppressed, and the difference in the amount of wear between the shoulder region Sh and the crown region Cr becomes smaller, so that uneven wear resistance can be enhanced.

An angle $\theta1$ of the inclined groove 3 with respect to the tire circumferential direction is preferably not less than 5 degrees and further preferably not less than 7 degrees, and is preferably not greater than 15 degrees and further preferably not greater than 13 degrees. The angle $\theta1$ of the inclined groove 3 is specified by a virtual line va connecting both ends e1 and e2 in the tire circumferential direction of the inclined groove 3.

Figure 5:
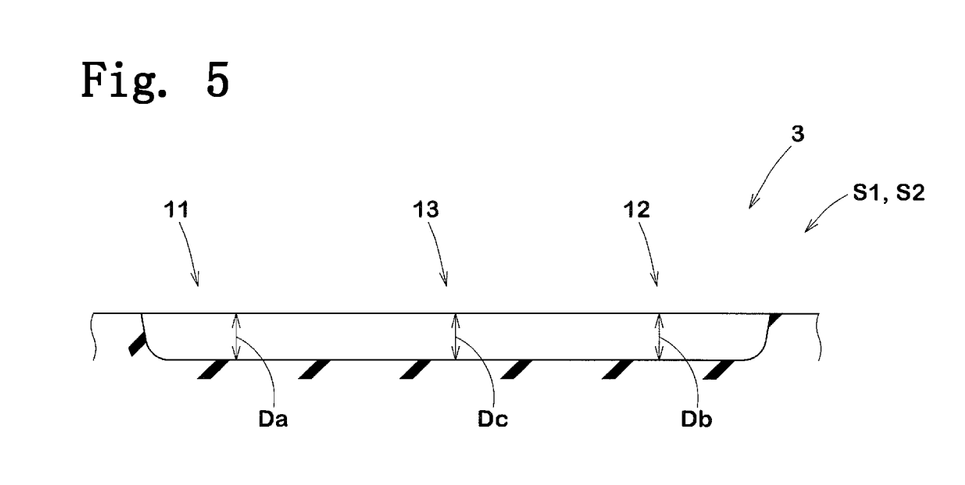
FIG. 5 is a cross-sectional view taken along a line A-A in FIG. 2.

FIG. 5 is a cross-sectional view taken along a line A-A in FIG. 2. As shown in FIG. 5, as for the groove depth, the third portion 13 is preferably not less than 70% and further preferably not less than 75% of the first portion 11 and the second portion 12, and is preferably not greater than 120% and further preferably not greater than 115% of the first portion 11 and the second portion 12. Since a groove depth Dc of the third portion 13 is not less than 70% and not greater than 120% of a groove depth Da of the first portion 11 and a groove depth Db of the second portion 12, an excessive change in the stiffness in the vicinity of the first portion 11, the second portion 12, and the third portion 13 can be reduced. Therefore, uneven wear resistance is enhanced. The groove depth Da of the first portion 11 and the groove depth Db of the second portion 12 are preferably, for example, 3.5 to 9.5 mm. Such a groove depth of the inclined groove 3 is applied to each of the inclined grooves 3 of the front wheel tire S1 and the rear wheel tire S2.

Figure 6:
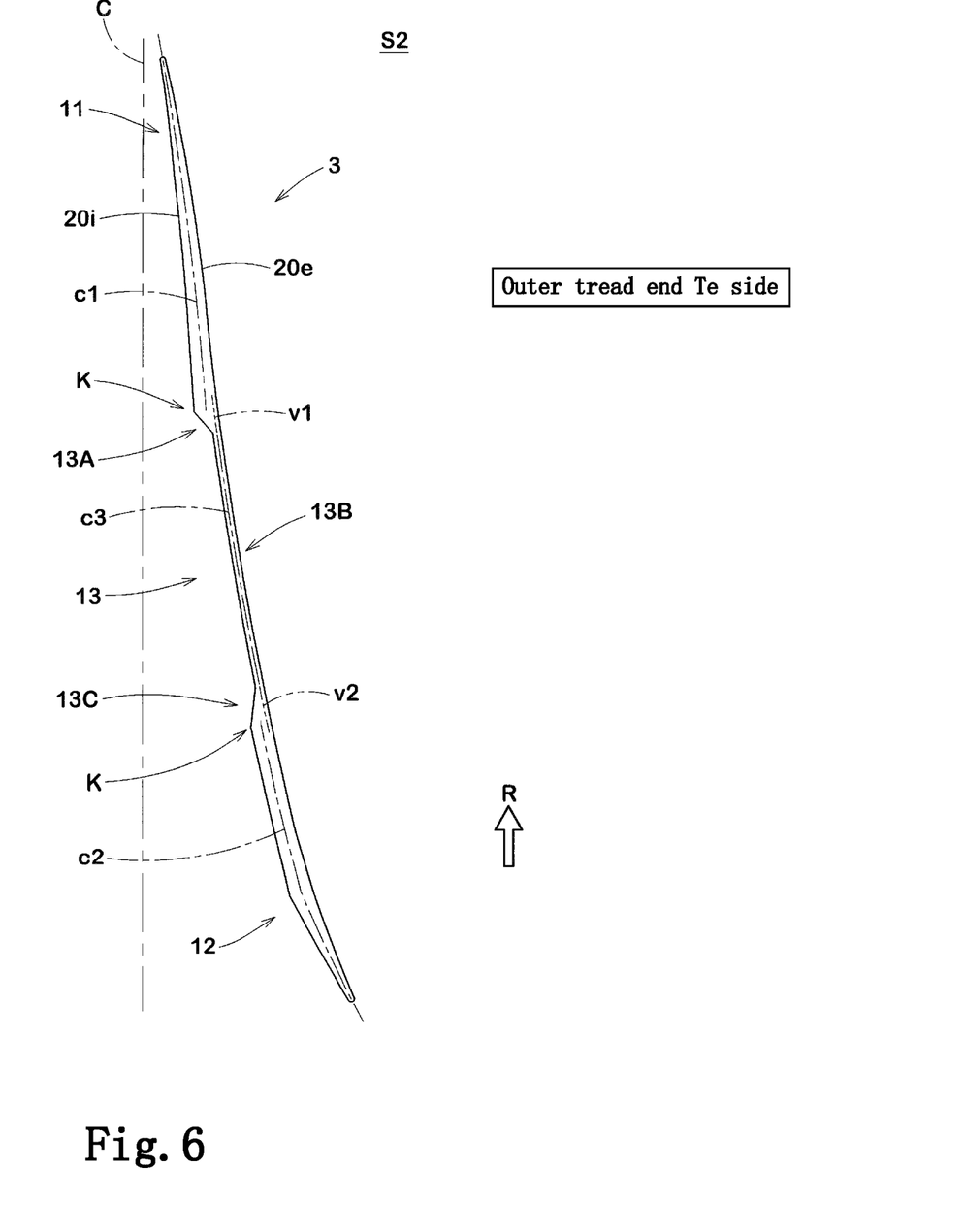
FIG. 6 is an enlarged view of an inclined groove in FIG. 2.

FIG. 6 is an enlarged view of an inclined groove 3 in FIG. 2. FIG. 6 shows an inclined groove 3 of the rear wheel tire S2. In general, in the rear wheel tire S2 which is mainly affected by a driving force, in each inclined groove 3, wear is likely to occur at the groove edge on the leading edge side in the tire rotation direction R. In the present embodiment, the groove edge on the leading edge side in the tire rotation direction R of the inclined groove 3 is the outer groove edge 20e on the tread end Te side. Meanwhile, the groove edge on the trailing edge side in the tire rotation direction R of the inclined groove 3 is the inner groove edge 20i on the tire equator C side. The inclined groove 3 comes into contact with the ground from the outer groove edge 20e on the tread end Te side toward the inner groove edge 20i on the tire equator C side based on the tire rotation direction R.

As shown in FIG. 6, in each inclined groove 3 of the rear wheel tire S2, a virtual line v1 obtained by extending a groove width center line c3 of the equal width portion 13B to the first portion 11 is located on the outer side in the tire axial direction with respect to a groove width center line c1 of the first portion 11 in the present embodiment. Accordingly, in the rear wheel tire S2, the stiffness of a tread land portion connected to the outer groove edge 20e on the tread end Te side (leading edge side in the tire rotation direction R) of the inclined groove 3 is kept higher than the stiffness of a tread land portion connected to the inner groove edge 20i on the tire equator C side of the inclined groove 3. Therefore, the rear wheel tire S2 has further enhanced uneven wear resistance. In addition, a virtual line v2 obtained by extending the groove width center line c3 of the equal width portion 13B to the second portion 12 is, for example, located on the outer side in the tire axial direction with respect to a groove width center line c2 of the second portion 12. Accordingly, the above-described effects are further effectively exhibited.

In the present embodiment, in the rear wheel tire S2, the outer groove edge 20e on the tread end Te side of the inclined groove 3 extends smoothly without having any bent portions. In addition, the inner groove edge 20i on the tire equator C side of the inclined groove 3 extends including bent portions K located on both sides in the longitudinal direction of the third portion 13. The bent portions K are formed in the first tapered portion 13A and the second tapered portion 13C.

Figure 7:
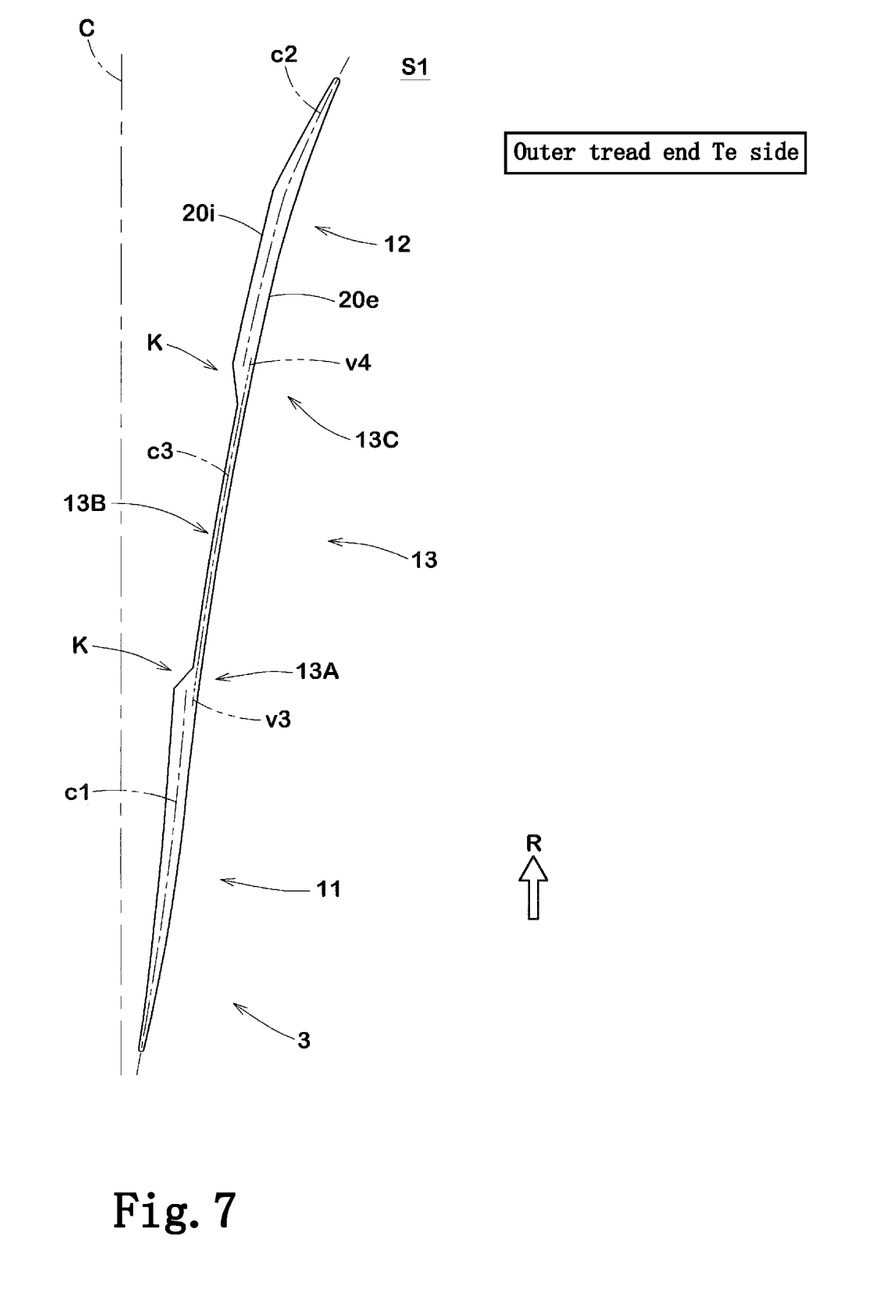
FIG. 7 is an enlarged view of an inclined groove in FIG. 1.

FIG. 7 is an enlarged view of an inclined groove 3 in FIG. 1. FIG. 7 shows an inclined groove 3 of the front wheel tire S1. In general, in the front wheel tire S1 which is mainly affected by a braking force, in each inclined groove 3, wear is likely to occur at the groove edge on the trailing edge side in the tire rotation direction R. In the present embodiment, the groove edge on the trailing edge side of the inclined groove 3 is the outer groove edge 20e on the tread end Te side. Meanwhile, the groove edge on the leading edge side in the tire rotation direction R of the inclined groove 3 is the inner groove edge 20i on the tire equator C side. The inclined groove 3 comes into contact with the ground from the inner groove edge 20i on the tire equator C side toward the outer groove edge 20e on the tread end Te side based on the tire rotation direction R. In addition, the inclined groove 3 comes into contact with the ground from the second portion 12 toward the third portion 13 based on the tire rotation direction R.

As shown in FIG. 7, in each inclined groove 3 of the front wheel tire S1, a virtual line v3 obtained by extending the groove width center line c3 of the equal width portion 13B to the first portion 11 is located on the outer side in the tire axial direction with respect to the groove width center line c1 of the first portion 11 in the present embodiment. Accordingly, in the front wheel tire S1, the stiffness of a tread land portion connected to the outer groove edge 20e on the tread end Te side (trailing edge side in the tire rotation direction R) of the inclined groove 3 is kept higher than the stiffness of a tread land portion connected to the inner groove edge 20i on the tire equator C side of the inclined groove 3. Therefore, the front wheel tire S1 can have further enhanced uneven wear resistance. In addition, a virtual line v4 obtained by extending the groove width center line c3 of the equal width portion 13B to the second portion 12 is, for example, located on the outer side in the tire axial direction with respect to the groove width center line c2 of the second portion 12. Accordingly, the above-described effects are further effectively exhibited.

In the present embodiment, in the front wheel tire S1, the outer groove edge 20e on the tread end Te side of the inclined groove 3 extends smoothly without having any bent portions. In addition, the inner groove edge 20i on the tire equator C side of the inclined groove 3 extends including bent portions K located on both sides in the longitudinal direction of the third portion 13. The bent portions K are formed in the first tapered portion 13A and the second tapered portion 13C.

As shown in FIG. 1 and FIG. 2, each of the tread portions 2 of the front wheel tire S1 and the rear wheel tire S2 is provided with first sub-inclined grooves 4 and second sub-inclined grooves 5 in the present embodiment. The first sub-inclined grooves 4 are, for example, located on the outer side in the tire axial direction with respect to the inclined grooves 3. The second sub-inclined grooves 5 are, for example, located on the outer side in the tire axial direction with respect to the first sub-inclined grooves 4.

The first sub-inclined grooves 4 and the second sub-inclined grooves 5 are each inclined in the same direction as the inclined groove 3. In addition, a groove edge 4e on the tread end Te side of each first sub-inclined groove 4 and a groove edge 5e on the tread end Te side of each second sub-inclined groove 5 extend smoothly without having any bent portions as in the outer groove edge 20e on the tread end Te side of the inclined groove 3. In addition, a groove edge 4i on the tire equator C side of each first sub-inclined groove 4 and a groove edge 5i on the tire equator C side of each second sub-inclined groove 5 each have a bent portion K as in the inner groove edge 20i on the tire equator C side of the inclined groove 3.

Figure 8:
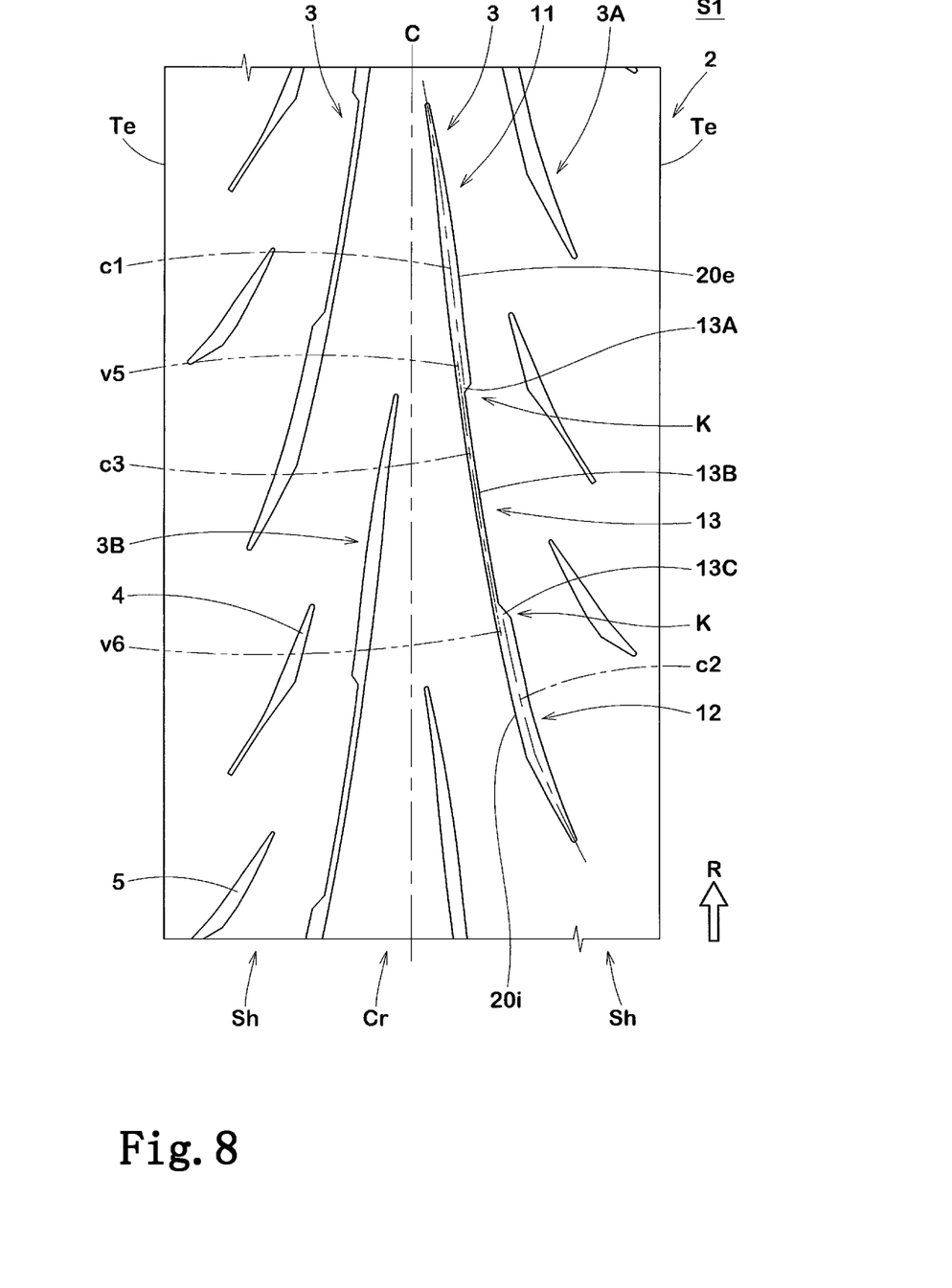
FIG. 8 is a plan view of a tread portion of a front wheel tire according to another embodiment.

FIG. 8 is a plan view of a tread portion 2 of a front wheel tire S1 according to another embodiment. The tread portion 2 of this embodiment has, for example, a designated tire rotation direction R. In addition, the tread portion 2 is provided with a plurality of inclined grooves 3. Each of the inclined grooves 3 comes into contact with the ground from the first portion 11 toward the third portion 13 based on the tire rotation direction R.

As shown in FIG. 8, in each inclined groove 3 of the front wheel tire S1, a virtual line v5 obtained by extending the groove width center line c3 of the equal width portion 13B to the first portion 11 is located on the tire equator C side with respect to the groove width center line c1 of the first portion 11 in the present embodiment. Accordingly, in the front wheel tire S1, the stiffness of a tread land portion connected to the inner groove edge 20i on the tire equator C side (trailing edge side in the tire rotation direction R) of the inclined groove 3 is kept higher than the stiffness of a tread land portion connected to the outer groove edge 20e on the tread end Te side of the inclined groove 3. Therefore, the front wheel tire S1 can have further enhanced uneven wear resistance. In addition, a virtual line v6 obtained by extending the groove width center line c3 of the equal width portion 13B to the second portion 12 is, for example, located on the inner side in the tire axial direction with respect to the groove width center line c2 of the second portion 12. Accordingly, the above-described effects are further effectively exhibited.

In the present embodiment, in the front wheel tire S1, the inner groove edge 20i on the tire equator C side of the inclined groove 3 extends smoothly without having any bent portions. In addition, the outer groove edge 20e on the tread end Te side of the inclined groove 3 extends including bent portions K located on both sides in the longitudinal direction of the third portion 13. The bent portions K are formed in the first tapered portion 13A and the second tapered portion 13C.

Although the motorcycle tire set according to the embodiments of the present invention has been described in detail above, the present invention is not limited to the above specific embodiments, and various modifications can be made to implement the present invention.

EXAMPLES

Motorcycle tire sets having the basic pattern in FIG. 1 or FIG. 2 were produced as test motorcycle tire sets, and were tested for uneven wear resistance and handling performance. The common specifications and the test method for the respective test tires are as follows.

<Uneven Wear Resistance and Handling Performance>

Each test motorcycle tire set was mounted on a motorcycle. A test rider rode the motorcycle on a dry asphalt circuit course. The test rider made sensory evaluation for the ease of handling at that time. In addition, after the ride, the test rider made sensory evaluation for the state of occurrence of uneven wear in the vicinity of the inclined grooves. The results of uneven wear resistance are indicated as scores with the state of occurrence of uneven wear of Comparative Example 1 being regarded as 100. The lower the value is, the better the uneven wear resistance is. In addition, the results of handling performance are indicated as scores with the ease of handling of Comparative Example 1 being regarded as 100. A higher value indicates that the handling performance is better.

Tire size: 120/70ZR17 (front wheel), 200/55ZR17 (rear wheel)

Rim size: MT3.50×17 (front wheel), MT6.00×17 (rear wheel)

Internal pressure: 250 kPa (front wheel), 290 kPa (rear wheel)

Engine displacement: 1000 cc

Riding distance: 5000 km

Average speed: 120 km/h

As for "position of v1" in Table 1, "outside" means that v1 is located on the outer side in the tire axial direction with respect to c1, "inside" means that v1 is located on the inner side in the tire axial direction with respect to c1, and "same" means that v1 and c1 overlap.

As for "position of v2" in Table 1, "outside" means that v2 is located on the outer side in the tire axial direction with respect to c2, "inside" means that v2 is located on the inner side in the tire axial direction with respect to c2, and "same" means that v2 and c2 overlap.

The test results are shown in Table 1.

TABLE 1

|  | Comp. Ex. 1 | Ex. 1 | Ex. 2 | Ex. 3 | Ex. 4 | Ex. 5 |
|---|---|---|---|---|---|---|
| Ls/TW (%) | 35 | 35 | 35 | 35 | 35 | 55 |
| Wc/Wa (%) | 35 | 35 | 35 | 35 | 20 | 35 |
| Position of v1 | Inside | Inside | Same | Outside | Outside | Outside |
| Position of v2 | Inside | Inside | Same | Outside | Outside | Outside |
| Tread shape of front wheel tire | FIG. 1 | FIG. 1 | FIG. 1 | FIG. 1 | FIG. 1 | FIG. 1 |
| Tread shape of rear wheel tire | FIG. 1 | FIG. 2 | FIG. 2 | FIG. 2 | FIG. 2 | FIG. 2 |
| Uneven wear resistance [Score: lower value is better] | 100 | 86 | 83 | 80 | 78 | 83 |
| Handling performance [Score: higher value is better] | 100 | 110 | 112 | 114 | 116 | 112 |

As a result of the test, it is confirmed that the tires of each Example have enhanced uneven wear resistance and handling performance as compared to the tires of Comparative Example 1. In addition, as a result of a drainage performance test performed separately, it is confirmed that the tires of each Example have improved drainage performance as compared to the tires of Comparative Example 1.

Additional Notes

The present invention includes the following aspects.

Present Invention 1

A motorcycle tire set including a front wheel tire and a rear wheel tire, wherein
  each of the front wheel tire and the rear wheel tire has a plurality of inclined grooves provided on a tread portion thereof so as to be inclined in a tire circumferential direction,
  each of the plurality of inclined grooves includes a first portion extending in a crown region, a second portion extending in a shoulder region, and a third portion connecting the first portion and the second portion,
  the third portion has a smaller groove width than the first portion and the second portion,
  the first portion, the second portion, and the third portion are inclined in the same direction with respect to the tire circumferential direction,
  the tread portion of the rear wheel tire has a designated tire rotation direction, and each of the plurality of inclined grooves of the rear wheel tire comes into contact with ground from the first portion toward the third portion based on the tire rotation direction.

Present Invention 2

The motorcycle tire set according to Present Invention 1, wherein
  the third portion includes an inner end connected to the first portion, and
  a shortest distance along a tread surface between the inner end and a tire equator is 30% to 55% of a tread ground-contact width.

Present Invention 3

The motorcycle tire set according to Present Invention 1 or 2, wherein, in a tread plan view in which the tread portion is developed in a flat surface, the third portion extends in a straight manner.

Present Invention 4

The motorcycle tire set according to Present Invention 1 or 2, wherein, in a tread plan view in which the tread portion is developed in a flat surface, the third portion extends in a curved manner.

Present Invention 5

The motorcycle tire set according to any one of Present Inventions 2 to 4, wherein
  in each of the plurality of inclined grooves of the rear wheel tire, the third portion includes a first tapered portion having a groove width that decreases from the inner end toward the second portion, and an equal width portion extending with a constant groove width, and
  a virtual line obtained by extending a groove width center line of the equal width portion to the first portion is located on an outer side in a tire axial direction with respect to a groove width center line of the first portion.

Present Invention 6

The motorcycle tire set according to Present Invention 5, wherein the third portion includes a second tapered portion having a groove width that decreases from an outer end connected to the second portion, toward the first portion.

Present Invention 7

The motorcycle tire set according to Present Invention 5 or 6, wherein a virtual line obtained by extending the groove width center line of the equal width portion to the second portion is located on the outer side in the tire axial direction with respect to a groove width center line of the second portion.

Present Invention 8

The motorcycle tire set according to any one of Present Inventions 1 to 7, wherein, as for a groove depth, the third portion is 70% to 120% of the first portion and the second portion.

Present Invention 9

The motorcycle tire set according to any one of Present Inventions 1 to 8, wherein, as for a groove width, the third portion is not greater than 55% of the first portion and the second portion.

Present Invention 10

The motorcycle tire set according to any one of Present Inventions 1 to 9, wherein a length in the tire axial direction of the third portion is not less than 7% of a tread development width.

Present Invention 11

The motorcycle tire set according to Present Invention 1 or 2, wherein, on the tread surface, a groove volume per unit area of the third portion is not less than 70% of a groove volume per unit area of the first portion and a groove volume per unit area of the second portion.

What is claimed is:

1. A motorcycle tire set comprising a front wheel tire and a rear wheel tire, wherein
    each of the front wheel tire and the rear wheel tire has a plurality of inclined grooves provided on a tread portion thereof so as to be inclined in a tire circumferential direction,
    each of the plurality of inclined grooves includes a first portion extending in a crown region, a second portion extending in a shoulder region, and a third portion connecting the first portion and the second portion,
    the third portion has a smaller groove width than the first portion and the second portion,
    the first portion, the second portion, and the third portion are inclined in the same direction with respect to the tire circumferential direction,
    the tread portion of the rear wheel tire has a designated tire rotation direction,
    each of the plurality of inclined grooves of the rear wheel tire comes into contact with ground from the first portion toward the third portion based on the tire rotation direction,
    a shortest distance between each of the plurality of inclined grooves and a tire equator is less than 10% of a tread ground-contact width, without crossing the tire equator,
    in each of the plurality of inclined grooves of the rear wheel tire, the third portion extends in the crown region and the shoulder region,
    a midpoint of the third portion is provided in the shoulder region,
    the shoulder region is a region that comes into contact with the ground in a state in which a camber angle is given to the tire,
    the crown region is a region that comes into contact with a flat surface in a state in which the tire is brought into contact with the flat surface with a standardized load at the camber angle of 0 degrees,
    the third portion includes an inner end connected to the first portion,
    a shortest distance along a tread surface between the inner end and the tire equator is 30% to 55% of the tread ground-contact width,
    in each of the plurality of inclined grooves of the rear wheel tire, the third portion includes a first tapered portion having a groove width that decreases from the inner end toward the second portion, and an equal width portion extending with a constant groove width, and
    a virtual line obtained by extending a groove width center line of the equal width portion to the first portion is located on an outer side in a tire axial direction with respect to a groove width center line of the first portion.

2. The motorcycle tire set according to claim 1, wherein, in a tread plan view in which the tread portion is developed in a flat surface, the third portion extends in a straight manner.

3. The motorcycle tire set according to claim 1, wherein, in a tread plan view in which the tread portion is developed in a flat surface, the third portion extends in a curved manner.

4. The motorcycle tire set according to claim 1, wherein, in each of the plurality of inclined grooves of the rear wheel tire, the third portion includes a second tapered portion having a groove width that decreases from an outer end connected to the second portion, toward the first portion.

5. The motorcycle tire set according to claim 1, wherein, in each of the plurality of inclined grooves of the rear wheel tire, a virtual line obtained by extending the groove width center line of the equal width portion to the second portion is located on the outer side in the tire axial direction with respect to a groove width center line of the second portion.

6. The motorcycle tire set according to claim 1, wherein, as for a groove depth, the third portion is 70% to 120% of the first portion and the second portion.

7. The motorcycle tire set according to claim 1, wherein, as for a groove width, the third portion is not greater than 55% of the first portion and the second portion.

8. The motorcycle tire set according to claim 1, wherein a length in the tire axial direction of the third portion is not less than 7% of a tread development width.

9. The motorcycle tire set according to claim 1, wherein, on a tread surface, a groove volume per unit area of the third portion is not less than 70% of a groove volume per unit area of the first portion and a groove volume per unit area of the second portion.

10. The motorcycle tire set according to claim 1, wherein the plurality of inclined grooves in the front wheel tire and the rear wheel tire includes at least first inclined grooves arranged between a tire equator and a tread end, and second inclined grooves arranged between the tire equator and an other tread end, wherein the first inclined grooves and the second inclined grooves are arranged alternately in the tire circumferential direction, and wherein the first inclined grooves and the second inclined grooves have a line symmetrical shape with respect to the tire equator.

11. The motorcycle tire set according to claim 8, wherein the length in the tire axial direction of the third portion is not greater than 23% of the tread development width.

12. The motorcycle tire set according to claim 1, wherein in each of the plurality of inclined grooves of the rear wheel tire, a virtual line is obtained by connecting both a first end and a second end of one of the plurality of inclined grooves in the tire circumferential direction, and an angle of the one of the plurality of inclined grooves with respect to the tire circumferential direction is not less than 5 degrees.

13. The motorcycle tire set according to claim 1, wherein in each of the plurality of inclined grooves of the front wheel tire, the third portion includes a first tapered portion having a groove width that decreases from the inner end toward the second portion, and an equal width portion extending with a constant groove width, and a virtual line obtained by extending a groove width center line of the equal width portion to the first portion is located on an outer side in the tire axial direction with respect to a groove width center line of the first portion.

14. The motorcycle tire set according to claim 13, wherein, in each of the plurality of inclined grooves of the front wheel tire, the third portion includes a second tapered portion having a groove width that decreases from an outer end connected to the second portion, toward the first portion.

15. The motorcycle tire set according to claim 14, wherein, in each of the plurality of inclined grooves of the front wheel tire, a virtual line obtained by extending the groove width center line of the equal width portion to the second portion is located on the outer side in the tire axial direction with respect to a groove width center line of the second portion.

* * * * *